Feb. 21, 1939.                M. J. GERRELLS                2,147,944
                        AUTOMATIC DIAL ILLUMINATOR
                            Filed June 23, 1936
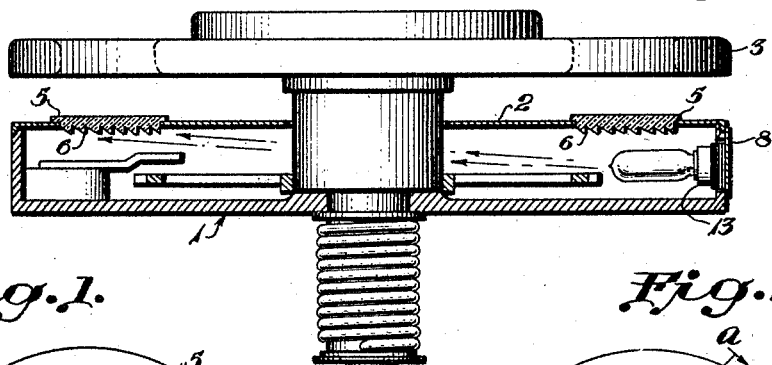
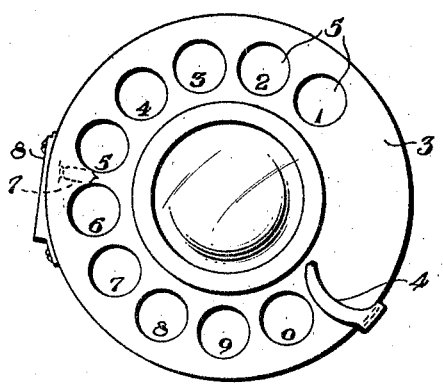
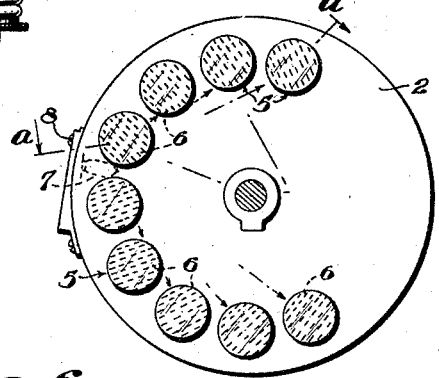
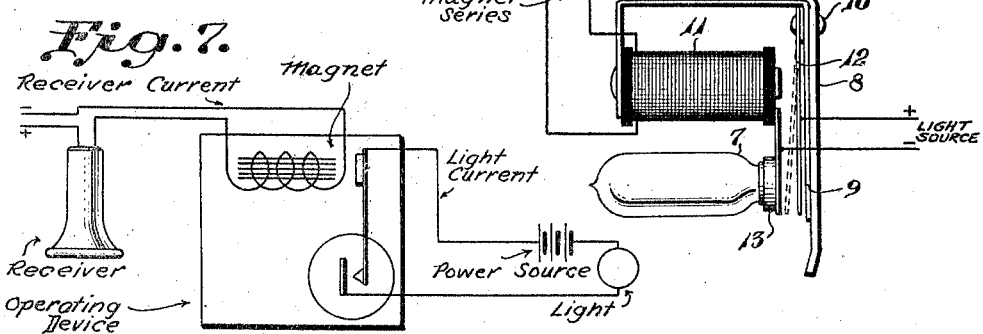
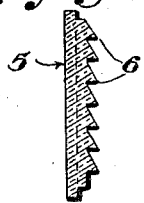

Patented Feb. 21, 1939

2,147,944

UNITED STATES PATENT OFFICE 2,147,944

AUTOMATIC DIAL ILLUMINATOR

Maude J. Gerrells, San Antonio, Tex.

Application June 23, 1936, Serial No. 86,844

1 Claim. (Cl. 240—2.17)

This invention relates to an automatic dial illuminator.

The object of the invention is the construction of a simple and efficient device which can be easily applied to the telephones now in use, or the same may be incorporated in newly manufactured telephones.

Another object of my invention is the provision of means for suitably and effectively illuminating a dial, which illuminating means does not in any way interfere with the operation of the telephone; further, the illuminating means is shut off when the telephone is not in use, thereby preventing a drain on the supply.

A still further object of the invention is the provision of independent dial units made from glass, crystal, or any other transparent material, and the shaping of such units, whereby a light located below the units will be deflected upwardly by prismatic undersides of the dial units.

With the foregoing and other objects in view, my invention comprises certain novel constructions, combinations and arrangements of parts as will be hereinafter fully described, illustrated in the accompanying drawing, and more particularly pointed out in the appended claim.

In the drawing:

Figure 1 is a top plan view of a device constructed in accordance with the present invention.

Figure 2 is a plan view of my invention, showing the rotatable finger disc removed, and the transparent units in position on the indicating disc.

Figure 3 is an enlarged view partly in vertical section and partly in side elevation of my device, taken on line A—A, Figure 2, and looking in the direction of the arrows.

Figure 4 is an enlarged plan view of one of the transparent units, while

Figure 5 is a vertical central sectional view of the same.

Figure 6 is an enlarged side view of the light source operating device, while

Figure 7 is a top plan view of the same.

Referring to the drawing by numerals, I designates an ordinary automatic telephone dial casing on which is positioned an indicating disc or cover 2. Suitably supported above indicating disc 2 is rotatable finger disc 3. A finger guard 4 (Fig. 1) is attached in the usual manner.

On indicating disc 2 I place a suitable number of transparent disc-like units 5 in an arcuate position, each of which is arranged to take the place of the ordinary station and numeral indicating means found on the telephone dials in common use. Each of these transparent units 5 is of the same thickness throughout and is arranged in the manner of a prism. Each flat transparent unit is provided on its under face with horizontally-aligned serrations 6 of the same depth; or said underface is prismatic shaped. In the preferred embodiment shown in the accompanying drawing the serrations 6 are arranged in parallelism so that the light rays will be better reflected through the units. In Figure 2 the light source is shown at 7, with arrows pointing from the light source, to indicate that the light rays hit the vertical surfaces of the serrations, because these surfaces are at right angles to the rays, and, therefore, the light source is so arranged that one-half of the number of units will receive their light from one side of the light source and one-half from the other side. Further, several discs near the light will scatter the light rays to the other individual discs, producing a very efficient lighting of all discs.

On each transparent unit there is placed suitable letters to designate the stations or exchanges, with a numeral to designate the particular number or subscriber to be called.

The light source comprises an operating device, including a nonconducting bracket 8 which is angular in shape to better adapt it to fit upon the curved side face of the dial. An auxiliary bracket 9 is fastened upon bracket 8, by means of rivet 10 and this bracket 9 supports a magnetic coil 11. A contact spring 12 is secured by rivet 10 near one end under magnetic coil 11, and its opposite end is under the bulb socket 13. When the receiver is removed from the hook (not shown) the circuit will be closed, whereby the magnetic coil 11 is energized, thereby drawing the contact spring 12 against it, closing the circuit and illuminating the interior of casing 1, whereby light rays are reflected through the transparent units 5, enabling the operator to readily "dial" the desired exchange and number of the subscriber's telephone. When the receiver is replaced upon the hook, the circuit is broken and the bulb discontinues to burn or be illuminated.

It is to be noted that the transparent units can be easily placed upon the standard telephone dial, as well as the operating device shown in Figures 1, 2, 3, 6 and 7, without changing or affecting the standard mechanism usually contained in casing 1. It is important that the prism structure on the under face of each transparent unit be such as to reflect the rays of light through the unit. This is admirably done by the structure disclosed in the accompanying drawing.

It is also to be understood that the illumination of the interior of casing 1 is accomplished automatically, by any desirable electrical hook-up (not shown) with the operating device shown specifically in Figures 6 and 7; this illumination is primarily controlled by the removal and the replacement of the receiver on the hook of the telephone, irrespective as to the model or shape of the particular telephone.

From the foregoing, it is also to be understood that the illuminating unit is self-contained and can be attached and detached from the dial casing by simply manipulating two screws. Further, the illuminating unit is actuated by a magnetic coil connected to the receiver by means of two wires, marked plus and minus, Fig. 7, and the current from the telephone system is sufficient to make contact for the power source supplying the incandescent bulb.

While I have described the preferred embodiment of my invention and illustrated the same in the accompanying drawing, certain changes or alterations may appear to one skilled in the art to which this invention relates during the extensive manufacture of the same, and I, therefore, reserve the right to make such alterations or changes as shall fairly fall within the scope of the appended claim.

What I claim is:

In an automatic telephone dial illuminator, the combination of a casing provided with a side opening and with a horizontal cover, an arcuate series of transparent flat discs extending vertically through said cover, each flat disc provided with an outer flat face spaced above the outer face of said cover, each transparent flat disc provided with parallel serrations on its under face all of the same depth, all of said serrations spaced below the inner face of said cover the same distance, a lamp supported in said side opening of the casing and projecting under said cover, and each transparent disc having its serrations positioned at an angle to the serrations on the other discs, whereby the rays from the lamp will strike the uniform-height serrations and will scatter to other discs thereby greatly increasing illuminating efficiency.

MAUDE J. GERRELLS.